United States Patent [19]
Vinarcik

[11] Patent Number: 5,545,368
[45] Date of Patent: Aug. 13, 1996

[54] METHOD OF MAGNETICALLY REINFORCING COMPOSITE COMPONENTS

[75] Inventor: Edward J. Vinarcik, Ypsilanti, Mich.

[73] Assignee: Ford Motor Company, Dearborn, Mich.

[21] Appl. No.: 423,200

[22] Filed: Apr. 18, 1995

Related U.S. Application Data

[62] Division of Ser. No. 375,875, Jan. 20, 1995.

[51] Int. Cl.$^6$ ............................................. B28B 1/02
[52] U.S. Cl. ............................................. 264/437; 264/310
[58] Field of Search ..................... 264/24, 402, 437, 264/310

[56] References Cited

U.S. PATENT DOCUMENTS

| | | | |
|---|---|---|---|
| 2,849,312 | 8/1958 | Peterman | 425/3 |
| 3,061,888 | 11/1962 | Wadham | 18/59 |
| 3,066,355 | 12/1962 | Schloemann et al. | 18/48 |
| 3,098,401 | 7/1963 | Breeze, Jr. et al. | 77/62 |
| 3,290,423 | 12/1966 | Hatch et al. | 264/294 |
| 3,468,997 | 9/1969 | Pickels | 264/108 |
| 3,488,410 | 1/1970 | Downes | 264/24 |
| 3,564,705 | 2/1971 | Cochardt | 264/24 |
| 3,619,866 | 11/1971 | Hofmann et al. | 164/34 |
| 3,620,286 | 11/1971 | Hofmann et al. | 164/34 |
| 3,625,666 | 12/1971 | James | 51/295 |
| 3,867,299 | 2/1975 | Rohatgi | 252/62.54 |
| 3,870,775 | 3/1975 | Castro et al. | 264/53 |
| 4,062,913 | 12/1977 | Miller et al. | 264/24 |
| 4,465,646 | 8/1984 | Evans et al. | 264/24 |
| 4,560,521 | 12/1985 | Walling et al. | 264/24 |
| 4,919,858 | 4/1990 | Newton et al. | 264/24 |
| 5,300,391 | 4/1994 | Fabian et al. | 430/127 |
| 5,407,612 | 4/1995 | Gould et al. | 264/24 |

FOREIGN PATENT DOCUMENTS

| | | |
|---|---|---|
| 3033271 | 3/1973 | Japan . |
| 9158224 | 2/1983 | Japan . |
| 0206442 | 3/1984 | Japan . |
| 2130138 | 5/1984 | United Kingdom . |

*Primary Examiner*—Christopher A. Fiorilla
*Attorney, Agent, or Firm*—Joseph J. Malleck, Esq.; Roger L. May, Esq.

[57] ABSTRACT

A method of magnetically reinforcing a composite component including the steps of adding a composite mixture of a solidifyable material and magnetically attractable reinforcing particles to a mold, applying selectively a magnetic field to a predetermined location of the mold, migrating translationally the magnetically attractable reinforcing particles by the magnetic field to the predetermined location of the mold, and solidifying the composite mixture after the magnetically attractable reinforcing particles have migrated to the predetermined location of the mold.

10 Claims, 1 Drawing Sheet

METHOD OF MAGNETICALLY REINFORCING COMPOSITE COMPONENTS

This is a division of U.S. patent application Ser. No. 08/375,875, filed Jan. 20, 1995.

BACKGROUND OF THE INVENTION

1. Field of the Invention

The present invention relates generally to composite components and, more specifically, to a method of magnetically reinforcing composite components as well as articles of manufacture made from them.

2. Description of the Related Art

The term "solidifyable" material is defined here as a fluid or liquid or pseudo-liquid which solidifies or hardens at a later stage into a substantially solid or rigid form. Generally, these solidifyable materials are poured or injected into a mold or cast or other type of "form" while in a fluid state, and then allowed to solidify into their rigid state, for example, by cooling, chemical reaction, or other. Examples of these solidifyable materials are plastic, glass, ceramic, rubber, concrete, even metal and others. Some of the plastic materials include epoxies, thermo-set materials, thermoplastic materials and others. These solidifyable materials are commonly used in many forms of manufacturing and for many articles of manufacture. Although these solidifyable materials have wide and varied uses for manufactured components, many plastic materials have limited strength, and for some applications, such as for making gears, bearings, and the like, they have limited ability to resist surface "wear".

It is known that "filler" materials can enhance various properties of these solidifyable materials. These filler materials come in a wide variety of substances, shapes, and sizes, and have in the past included such substances as glass, carbon fibre, and the like. Generally, the filler materials are added to improve the strength of the solidifyable materials without otherwise significantly degrading the characteristics and performance of the solidifyable materials in other ways. An example of a filler material to reinforce a plastic article is disclosed in U.S. Pat. No. 3,061,888 to Bradham. This patent discloses adding filler material to a predetermined location of a mold prior to adding plastic material to the mold. However, this process suffers from the disadvantage that it is difficult to employ in many applications and is undesired. As a result, it is desired to add and mix filler materials with solidifyable materials prior to the injection or pouring of the solidifyable material into a mold.

During molding of solidifyable materials, difficulty has sometimes been experienced when attempting to fill small recesses of a mold with the filler materials, especially when the filler material was in the form of elongated fibers. The recesses generally have a somewhat narrowing or otherwise restricted in-flow path during the molding operation. As a result, the elongated fibers have a tendency to "dam up" in the entrance to the recess, resulting in incomplete filling of the recess, or resulting in a low concentration of the filler material in the recess where their presence would be most desirable. One attempt to overcome this difficulty is to cause migration of the filler material to concentrate it in selected locations of the component to be molded. An example of such a process is disclosed in U.S. Pat. No. 3,870,775 to Castro et al. for a method of making shaped articles. This patent discloses migrating filler material to a predetermined location of a shaped article by centrifuging a flammable mixture of curable resin and fibrous filler. However, this centrifuging process suffers from the disadvantage that it is expensive and is undesired.

Another example of a process to cause migration of the filler material is disclosed in U.S. Pat. No. 3,098,401 to Breeze, Jr. et al. for a method of making a drill plate. This patent discloses attracting steel particles and forcing them to migrate from other parts of a liquid suspension medium to a position about a magnetic core which is utilized to locate a drill hole at a predetermined location in a drill plate. However, this process suffers from the disadvantage that filler particles are left throughout the molded article and is undesired.

SUMMARY OF THE INVENTION

Accordingly, the present invention is a method of magnetically reinforcing a composite component. The method includes the steps of adding a composite mixture of a solidifyable material and magnetically attractable reinforcing particles to a mold. The method also includes the steps of applying selectively a magnetic field to a predetermined location of the mold and migrating translationally the magnetically attractable reinforcing particles by the magnetic field to the predetermined location of the mold. The method further includes the steps of solidifying the composite mixture after the magnetically attractable reinforcing particles have migrated to the predetermined location of the mold.

Additionally, the present invention is a magnetically reinforced composite component. The magnetically reinforced composite component includes a solidified composite mixture of a solidifyable material and magnetically attractable reinforcing particles disposed in the solidifyable material. The magnetically attractable reinforcing particles are migrated by a magnetic field to a predetermined location of the composite component prior to the solidifyable material being solidified.

One advantage of the present invention is that a method is provided of magnetically reinforcing composite components. Another advantage of the present invention is that the composite component is manufactured using a solidifyable fluid and magnetically attractable reinforcing particles. Yet another advantage of the present invention is that the magnetically attractable reinforcing particles are migrated by a magnetic field through the solidifyable fluid to a predetermined location of the composite component before the solidifyable fluid has solidified. Still another advantage of the present invention is that the composite component may be a gear and the magnetically attractable reinforcing particles have a higher resistance to wear than the solidified fluid of the gear. A further advantage of the present invention is that composite components can be produced through molding, casting, or similar processes. Yet a further advantage of the present invention is that the magnetic field can be used to migrate the magnetically attractable reinforcing particles in recesses of the mold or at surfaces thereof, as opposed to being distributed uniformly throughout the whole component.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
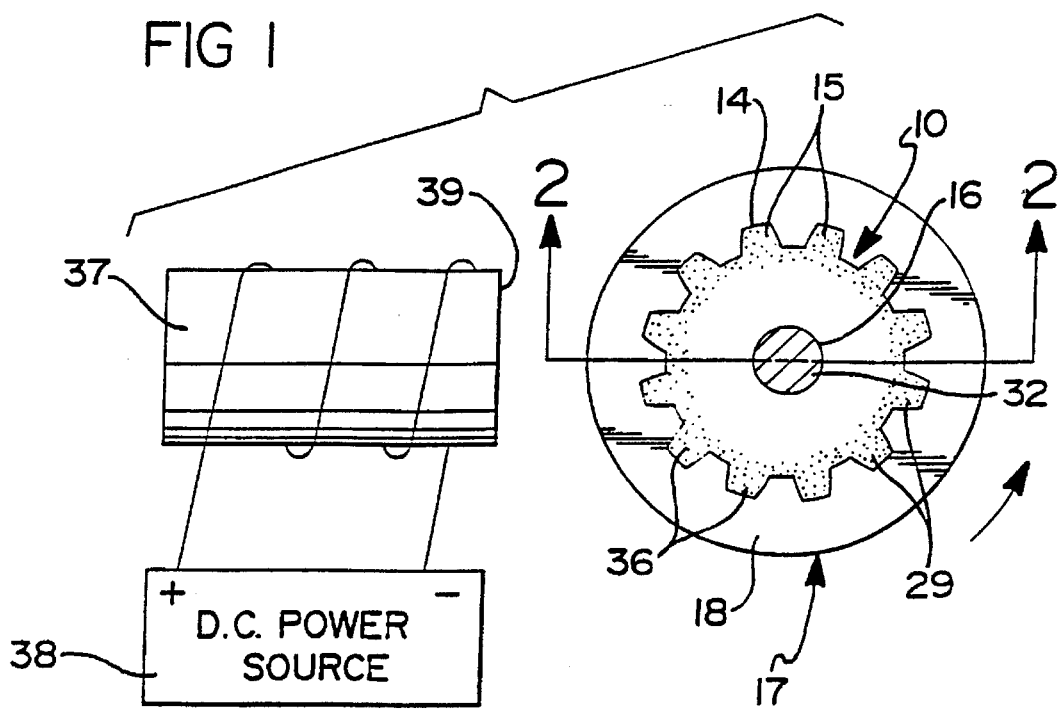
FIG. 1 is a schematic view of a magnetically reinforced composite component, according to the present invention, illustrated in operational relationship with a mold for making the same.
Figure 2:
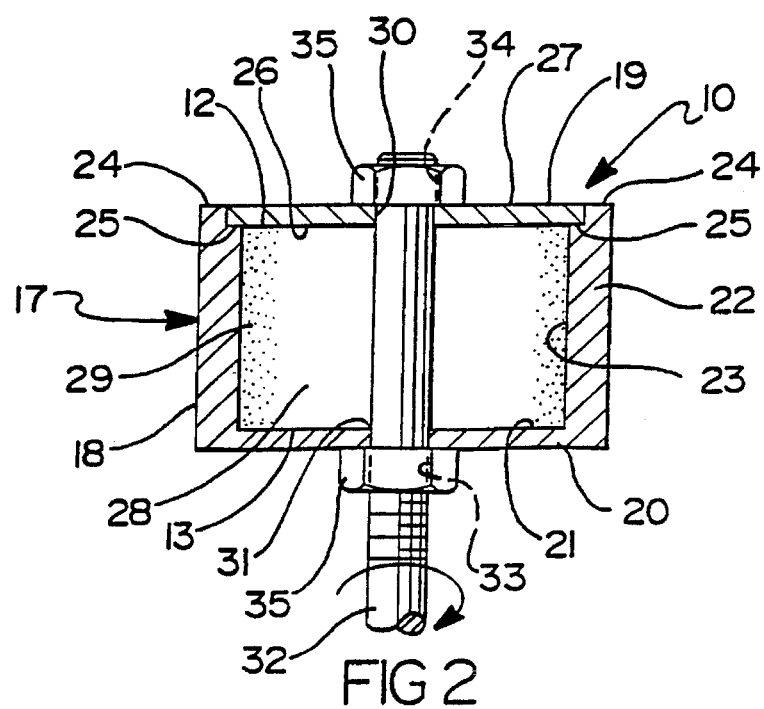
FIG. 2 is a sectional view taken along line 2—2 of FIG. 1.

Referring to FIGS. 1 and 2, one embodiment of a composite component 10, according to the present invention, such as a gear is shown in the process of being molded. The composite component 10 has generally flat first and second side surfaces 12 and 13 and a generally circumferential radial edge surface 14 including teeth 15. The composite component 10 also has a generally cylindrical hole 16 extending therethrough centrally of the first and second side surfaces 12 and 13 with its cylindrical axis oriented generally perpendicular thereto. It should be appreciated that the composite component 10 may have other shapes and uses such as a shaft, bearing, housing or other generally circular object.

As illustrated, a mold, generally indicated at 17, is used to make the composite component 10. The mold 17 includes a base 18 and a cover 19. The base 18 has a bottom wall 20 with an inside surface 21, a generally cylindrical circumferential side wall 22 with its own inside surface 23 and a generally annular upper edge 24. The upper edge 24 of the side wall 22 has a generally annular recessed step 25 to receive the cover 19 when the mold 17 is assembled for molding. The cover 19 is generally flat and circular in configuration, having an inside lower surface 26 and an outside upper surface 27.

The mold 17 also includes a cavity 28 in the shape of the composite component 10 to be molded. In one embodiment, the composite component 10 is cut or otherwise formed partially into the base 18 and partially into the cover 19. The side wall 22 of the base 18 has a series of equally spaced radial recesses 29 on the inside surface 23 to form the teeth 15 of the composite component 10 during the molding process, as is typical in the molding art. The inside surface 21 of the bottom wall 20 forms the first side surface 12 of the composite component 10, and the inside surface 26 of the cover 19 forms the second side surface 13 of the composite component 10. The cover 19 has a generally circular hole 30 through its center, and the base 18 has a generally circular hole 31 through the center of its bottom wall 20 which aligns with the hole 30 in the cover 19 when the mold 17 is assembled.

The mold 17 further includes a generally cylindrical shaft 32 extending through the holes 30 and 31 in the cover 19 and base 18, respectively, with enough clearance to insert the shaft 32 into and remove it from the holes 30 and 31, but not so much clearance that the assembled mold 17 will leak during the molding operation. The shaft 32 has a first set of threads 33 at a lower position and a second set of threads 34 at an upper position. Retaining nuts 35 are threadably attached to the shaft 32 at these positions to hold the mold 17 together during molding, as should be well recognized by those skilled in the molding art. The shaft 32 also serves to form the central hole 16 in the composite component 10 when formed, as is typical of gears. Thus, the cylindrical axis of the shaft 32 coincides with the cylindrical axis of the hole 16 passing through the composite component 10. When the mold 17 is assembled, the cover 19 fits into the recessed step 25 in the upper edge 24 of the side wall 22 of the base 18, with the shaft 32 extending therethrough and with the retaining nuts 35 attached, so as to complete the closed cavity 28 for making the composite component 10.

The mold 17 can be made according to any of the well known mold making techniques commonly in use, and made out of many different materials. However, as will be appreciated more fully hereinafter, in this particular embodiment, the mold 17 is made of non-magnetic material such as clay, brass, aluminum, rubber, etc.

The composite component 10 is made of a solidifyable material as previously defined. In one embodiment, epoxy is the solidifyable material. As is well known in the art, epoxy materials are two component compounds of a resin material and a hardener material. When the two materials are mixed together in proper proportions, a chemical reaction causes the mixture to gradually harden or set over a predetermined period of time. The time depends on the particular epoxy used, and may vary from material to material. Preferably, the epoxy is a polyester material. When initially mixed, both materials are in a fluid state and the initial mixture itself is in a fluid state. It should be appreciated that the solidifyable material may be one other than a thermoset such as liquid Magnesium or Tin.

The composite component 10 is also made of a filler material as previously defined. In one embodiment, the filler material is magnetically attractable reinforcing particles 36 such as cold rolled steel or ferromagnetic particles. The magnetically attractable reinforcing particles 36 may be in the form of filings, powders, whiskers or fibers. In one embodiment, the magnetically attractable reinforcing particles 36 are cold rolled steel filings in the form of fibers added to the initial mixture and mixed such that the solidifyable composite mixture is in a fluid state. The composite mixture is poured or injected into the mold 17. The solidifyable material fills the mold 17, taking on its shape, and when allowed to solidify or harden in the mold 17, produces the composite component 10 conforming the shape of the mold 17.

The solidifyable composite mixture is put into the mold 17, typically as in other molding or casting operations well known in the art. In one embodiment, the solidifyable composite mixture is added to the cavity 28 in the base 18 of the mold 17 by pouring, after the shaft 32 has been extended through the hole 31 in the bottom wall 20 of the base 18 with the lower retaining nut 35 attached to the threads 33.

After the base 18 of the mold 17 has been filled with the solidifyable composite mixture, the mold 17 is substantially sealed by fitting the cover 19 to the base 18 as described above with the distal end of the shaft 32 extending through the central hole 30 in the cover 19. The shaft 32 is secured to the mold 17 by attaching the retaining nut 35 to the threads 34 at the distal end of the shaft 32, so that the fluid does not leak out of the mold 17 while it is solidifying, and while other steps of the method are carried out.

After the mold 17 is filled and sealed, and while the solidifyable composite mixture is solidifying from its fluid state to its solidified state, the mold 17 is fixtured for rotational movement about the axis of the shaft 32, with the axis in a substantially horizontal position. This horizontal positioning of the axis helps prevent the magnetically attractable reinforcing particles 36 from settling out to one side of the mold 17 under the influence of gravity before the composite mixture solidifies. The fixturing of the mold 17 is not shown, as such fixturing is believed to be well within the ordinary skill in the art.

As illustrated in FIG. 1, at least one magnet 37 such as an electromagnet is positioned adjacent the mold 17 with direct current power applied from a D.C. power source 38 while the mold 17 is rotating. Preferably, the mold 17 rotates with respect to the magnetic field produced by the magnet 37 while the solidifyable composite mixture is in a fluid state and in the process of solidifying. The magnet 37 is selectively located to a predetermined location relative to the mold 17. The magnet 37 is centered between the first and second side surfaces 12 and 13 of the composite component 10 as molded, with one magnetic pole 39 radially adjacent the recesses 29 in the base 18 of the mold 17 which form the teeth 15 of the composite component 10. The magnet 37 is displaced radially from the axis of rotation of the mold 17 by an amount sufficient to allow the mold 17 to rotatably move without interference from the magnet 37 or its supporting structure (not shown), and close enough to attract and migrate the magnetically attractable reinforcing particles 36 in the solidifyable composite mixture.

The magnet 37 produces a non-uniform magnetic field relative to the mold 17. The magnetically attractable reinforcing particles 36 are susceptible to magnetic forces and the solidifyable material is not. As a result, the magnet field selectively applies a non-uniform magnetic force on the magnetically attractable reinforcing particles 36. The mold 17 is rotated at a relatively slow speed such as two to four complete rotations per minute to allow translational migration of the magnetically attractable reinforcing particles 36 only due to the magnetic force and not by a centrifugal force. As the mold 17 is rotated while the solidifyable composite mixture is still in its fluid state prior to solidifying, the magnetically attractable reinforcing particles 36 migrate in response to, and under the selective influence of the magnetic force, toward the side wall 22 of the base 18 of the mold 17. The magnetically attractable reinforcing particles 36 are concentrated into predetermined locations in the recesses 29 of the mold 17 which form the teeth 15 of the composite component 10, at the surfaces thereof. The mold 17 is rotated under the influence of the magnet 37 until the solidifyable composite mixture sets into a solidified matrix. It should be appreciated that the magnet 37 may be rotated relative to the mold 17. It should also be appreciated that the magnetic field may be applied as the mixture is simultaneously poured, cast or injected into the mold 17.

The timing and strength of the magnetic field will depend on various factors such as the composition, setting time, temperature, viscosity, etc. of the solidifyable material, the migrating time and desired concentrations of the magnetic reinforcing particles, and other factors. Such factors can be determined empirically. The magnetic force must be strong enough to migrate the magnetically attractable reinforcing particles 36, in the desired concentrations and gradients, to the predetermined portions of the mold 17 before the solidifyable material has solidified. It should be appreciated that the mold 17 may be placed in a curing oven at a 150 degrees for 15 minutes to cure the composite component 10.

After the composite mixture has sufficiently solidified according to normal molding practice, the magnetically attractable reinforcing particles 36 will be bound in the solidified material in the teeth 15 of the composite component 10, and the mold 17 can be disassembled, and the composite component 10 removed therefrom. The composite component 10 will have a non-uniform distribution of magnetically attractable reinforcing particles 36, with a higher concentration and higher proportion of magnetically attractable reinforcing particles 36 in the teeth 15, and proximate the surface of the teeth 15, than the average concentration of magnetically attractable reinforcing particles 36 in the composite component 10 as a whole. Because the magnetically attractable reinforcing particles 36 have a higher wear resistance than the solidified material for many applications, the wear resistance of the teeth 15 is improved without necessarily having a high concentration of magnetically attractable reinforcing particles 36 in the remainder of the composite component 10. This can result in lighter parts, a potential for time and material savings in manufacturing of many different types of articles, and other advantages which will be apparent to those skilled in the art.

It is also contemplated that more than one filler material could be used in practicing the present invention. For example, the magnetically attractable reinforcing particles 36 could be used to promote and force non-magnetic fibers (not shown) into selected recesses 29 of the mold 17. Additionally, the magnetically attractable reinforcing particles 36 could be coated with non-attracted compounds (by any known coating technique), to provide, for example, corrosion resistance, further enhanced wear resistance, and/or other advantages. It should be appreciated that the method of the present invention may also be applied to other articles of manufacture, such as tire threads, screw threads, bearing surfaces (both inner and outer surfaces), and others.

The present invention has been described in an illustrative manner. It is to be understood that the terminology used is intended to be in the nature of words of description rather than of limitation.

Many variations and modifications of the present invention are possible in light of the above teachings. Therefore, within the scope of the appended claims, the present invention may be practiced otherwise than as specifically described.

What is claimed:

1. A method of magnetically reinforcing a composite component, said method comprising the steps of:

adding a composite mixture of a solidifyable material and magnetically attractable reinforcing particles to a mold having a circumferential radial edge;

selectively applying a non-uniform magnetic field to predetermined location of the mold by placing not more than one magnetic pole of a magnet adjacent to, but spaced from, the circumferential radial edge of the mold;

migrating translationally the magnetically attractable reinforcing particles by the magnetic field to the predetermined location of the mold; and solidifying the composite mixture after the magnetically attractable reinforcing particles have migrated to the predetermined location of the mold.

2. A method as set forth in claim 1 wherein said step of applying the magnetic field comprises moving either the mold or the magnetic field with respect to each other.

3. A method as set forth in claim 1 wherein said step of migrating comprises migrating translationally the magnetically attractable reinforcing particles by the magnetic field through the solidifyable material to at least one predetermined recess of the mold.

4. A method as set forth in claim 1 wherein said step of migrating further comprises concentrating the magnetically attractable reinforcing particles at the predetermined location in response to the magnetic field in a higher proportion than the average concentration of magnetically attractable reinforcing particles in the mold as a whole.

5. A method as set forth in claim 1 wherein said step of migrating comprises migrating translationally the magnetically attractable reinforcing particles through the solidifyable material proximate a surface portion of the composite component being molded.

6. A method as set forth in claim 1 including the step of coating the magnetically attractable reinforcing particles with a different material than the magnetically attractable reinforcing particles themselves.

7. A method as set forth in claim 1 including the step of rotating the magnetic field or mold at a relatively low speed to allow migration of the magnetically attractable reinforcing particles only by the magnetic field.

8. A method as set forth in claim 1 including the step of mixing a non-magnetic filler material with the magnetically attractable reinforcing particles and solidifyable material in its fluid state.

9. A method as set forth in claim 1 wherein the step of applying a non-uniform magnetic field at a predetermined location of the mold includes the steps of placing a single magnetic pole of the magnet at a single point spaced from the circumferential radial edge of the mold and rotating the mold relative to said single magnetic pole.

10. A method of making a generally circular composite component, said method comprising the steps of:

mixing magnetically attractable reinforcing particles with a solidifyable material while the material is in its fluid state to form a composite mixture;

filling a mold having a circumferential radial edge with the composite mixture;

subjecting the magnetically attractable reinforcing particles to a magnetic force by applying a non-uniform magnetic field at a predetermined location of the mold by placing not more than one magnetic pole of a magnet adjacent to, but spaced from, the circumferential radial edge of the mold such that said magnetic force selectively operates on the magnetically attractable reinforcing particles while mixed with the composite mixture;

migrating translationally the magnetically attractable reinforcing particles in response to the magnetic force to a predetermined location proximate a surface portion of the composite component; and solidifying the composite mixture after the magnetically attractable reinforcing particles have migrated to the predetermined location proximate the surface portion.

* * * * *